(12) United States Patent
Hansen

(10) Patent No.: US 8,267,376 B2
(45) Date of Patent: Sep. 18, 2012

(54) QUICK CONNECT VALVE WITH INTEGRAL BACKFLOW VALVE

(75) Inventor: Erik Jordan Hansen, Westmont, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 303 days.

(21) Appl. No.: 12/788,397

(22) Filed: May 27, 2010

(65) Prior Publication Data
US 2011/0291038 A1    Dec. 1, 2011

(51) Int. Cl.
*F16L 37/28*    (2006.01)

(52) U.S. Cl. ............... 251/149.6; 251/149; 251/149.8; 137/515.5

(58) Field of Classification Search ............. 251/149.6, 251/149, 149.8; 137/515, 515.5
See application file for complete search history.

(56) References Cited

U.S. PATENT DOCUMENTS

| | | | | |
|---|---|---|---|---|
| 244,320 A | * | 7/1881 | Schofield | 251/149.6 |
| 3,095,899 A | * | 7/1963 | Billington | 137/454.5 |
| 5,547,166 A | * | 8/1996 | Engdahl | 251/149.6 |
| 5,630,570 A | * | 5/1997 | Lacroix et al. | 251/149.9 |
| 5,816,298 A | * | 10/1998 | Stricklin et al. | 141/346 |
| 5,924,407 A | | 7/1999 | Iwaszkiewicz | |
| 6,044,815 A | | 4/2000 | De Ojeda | |
| 6,263,842 B1 | | 7/2001 | De Ojeda | |
| 6,279,874 B1 | * | 8/2001 | Nyberg | 251/149.6 |
| 6,338,320 B1 | | 1/2002 | De Ojeda | |
| 6,461,117 B2 | | 10/2002 | Thomas | |
| 7,134,641 B2 | | 11/2006 | Jensen | |
| 7,195,228 B2 | * | 3/2007 | Tiberghien et al. | 251/149.6 |
| 7,281,529 B2 | | 10/2007 | Lew | |
| 2005/0161628 A1 | * | 7/2005 | Tiberghien et al. | 251/149.6 |
| 2006/0086922 A1 | | 4/2006 | Jensen | |
| 2010/0127198 A1 | * | 5/2010 | Cozza | 251/149.1 |

* cited by examiner

*Primary Examiner* — John Rivell
*Assistant Examiner* — Umashankar Venkatesan
(74) *Attorney, Agent, or Firm* — Mark C. Bach; Jeffrey P. Calfa

(57) ABSTRACT

A quick connect fluid valve assembly comprises a housing, a flow passage insert, and a movable connector. The flow passage insert is disposed at least partially within the housing and is movable relative to the housing. The flow passage insert forms a flow path from a first end of the flow passage insert to a second end of the flow passage insert. The movable connector is disposed in fluid communication with the flow path of the flow passage insert and the movable connector has at least one orifice. The movable connector is movable between a forward fluid flow position that allows forward fluid flow within the flow path of the flow passage insert and a backward fluid flow position that prevents backward fluid flow within the flow path of the flow passage insert.

20 Claims, 1 Drawing Sheet

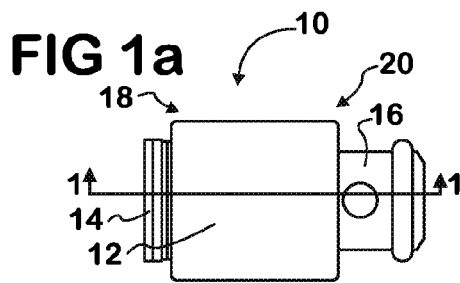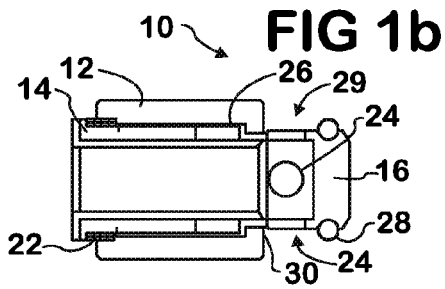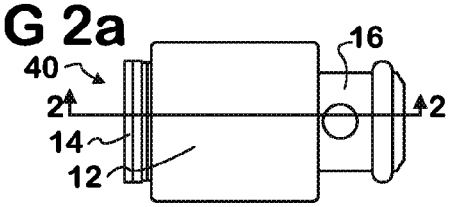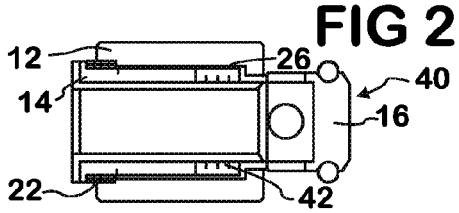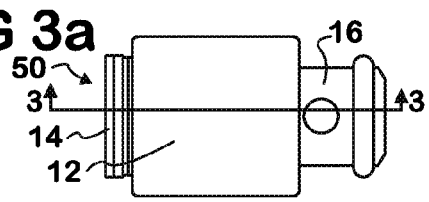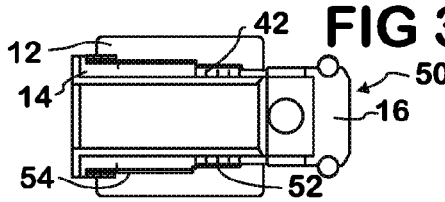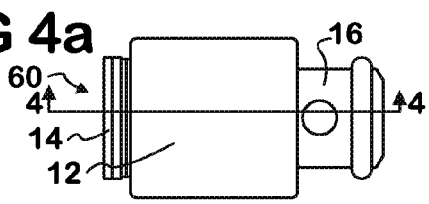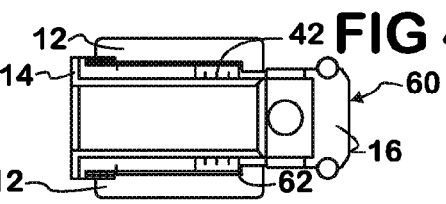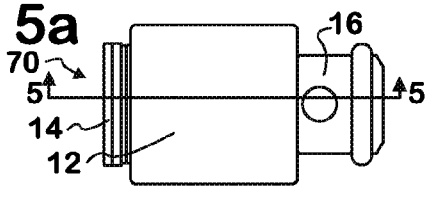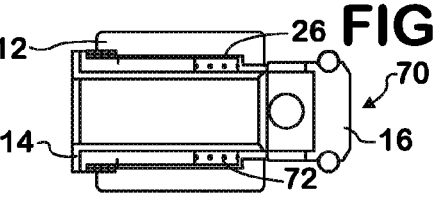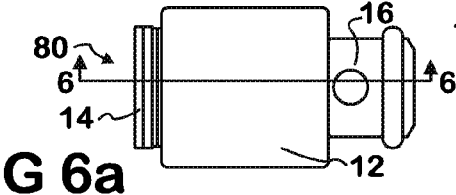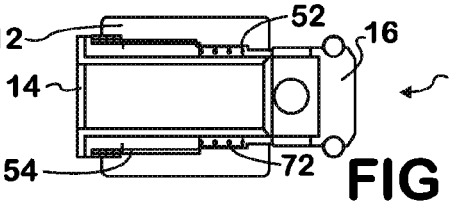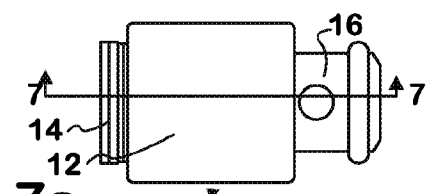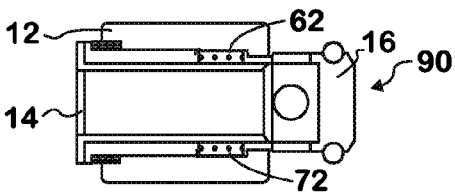

QUICK CONNECT VALVE WITH INTEGRAL BACKFLOW VALVE

TECHNICAL FIELD

The present disclosure relates to quick connect valve, and more particularly to a quick connect valve having an integral back flow valve.

BACKGROUND

Many fluid flow systems utilize quick connect fittings in order ease the assembly and disassembly of fluid flow systems. One example of a fluid flow system that may utilize a quick connect fitting is a fluid line from a fuel tank to a fuel filter on a vehicle. A quick connect fitting allows a user to easily disconnect the fuel line from the fuel filter without the use of additional tools. One drawback of existing quick connect fittings is that a separate back flow valve, or check valve, is required within the fluid flow system to prevent fluid from flowing backwards from the intended direction when a fluid pump is not active. This may cause damage to components connected to the fluid flow system, and may allow air to enter the fluid flow system. When air enters a fluid flow system, the fluid flow system must be bled, releasing an amount of air and fluid from the system so that only fluid remains, or significant damage may result. Thus, a need exists for a quick connect fluid valve assembly having a built in back flow valve.

SUMMARY

According to one embodiment, a quick connect fluid valve assembly comprises a housing, a flow passage insert, a moveable connector, and a biasing member. The housing has a first end an a second end. The flow passage insert is disposed within at least a portion of the housing and has a fluid flow path defined within the flow passage insert. The flow passage insert has a connected position and a disconnected position. The moveable connector is disposed in fluid communication with flow path of the flow passage insert. The moveable connector has at least one orifice. The moveable connector is movable between at least a first position relative to the flow passage insert and a second position relative to the flow passage insert. In the first position, fluid can flow within the fluid flow path of the flow passage insert and out of the at least one orifice when the flow passage insert is disposed in the connected position. In the second position, fluid is prevented from flowing within the fluid flow path of the flow passage insert and out of the at least one orifice when the flow passage insert is disposed within the connected position. The biasing member is disposed between the housing and the flow passage insert and contacts both the housing and the flow passage insert. The biasing member biases the flow passage insert towards the disconnected position. The moveable connector forms a generally fluid tight seal with the housing when the flow passage insert is disposed within the disconnected position to prevent fluid flow within the fluid flow path.

According to another embodiment, a quick connect fluid valve assembly comprises a housing, a flow passage insert, a movable connector, and a connecting collar. The flow passage insert is disposed at least partially within the housing and is movable relative to the housing between a disconnected position and a connected position. The flow passage insert has a flow path defined from a first end of the flow passage insert to a second end of the flow passage insert. The moveable connector is disposed in fluid communication with the flow path of the flow passage insert. The moveable connector has at least one orifice. The movable connector is movable between a forward fluid flow position and a backward fluid position relative to the flow passage insert. The movable connector has a ledge portion at a first end of the movable connector. The movable connector additionally is movable relative to the housing. The connecting collar is disposed between the flow passage insert and the moveable connector. The connecting collar has an extending lip at a first end of the connecting collar and is coupled to the flow passage insert at a second end of the connecting collar. The extending lip of the connecting collar contacts the ledge portion of the movable connector. The movable connector moves substantially in conjunction with the flow passage insert and relative to the housing when the flow passage insert moves from the connected position to the disconnected position.

According to a further embodiment, a quick connect fluid valve assembly comprises a housing, a flow passage insert, and a movable connector. The flow passage insert is disposed at least partially within the housing and is movable relative to the housing. The flow passage insert forms a flow path from a first end of the flow passage insert to a second end of the flow passage insert. The movable connector is disposed in fluid communication with the flow path of the flow passage insert and the movable connector has at least one orifice. The movable connector is movable between a forward fluid flow position that allows forward fluid flow within the flow path of the flow passage insert and a backward fluid flow position that prevents backward fluid flow within the flow path of the flow passage insert.

BRIEF DESCRIPTION OF THE DRAWINGS

FIG. 1a is a side view of a quick connect fluid flow valve according to one embodiment FIG. 1b is a sectional view taken through line 1-1 of FIG. 1a.

FIG. 2a is a side view of a quick connect fluid flow valve according to one embodiment FIG. 2b is a sectional view taken through line 2-2 of FIG. 2a FIG. 3a is a side view of a quick connect fluid flow valve according to one embodiment.

FIG. 3b is a sectional view taken through line 3-3 of FIG. 3a.

FIG. 4a is a side view of a quick connect fluid flow valve according to one embodiment.

FIG. 4b is a sectional view taken through line 4-4 of FIG. 4a.

FIG. 5a is a side view of a quick connect fluid flow valve according to one embodiment.

FIG. 5b is a sectional view taken through line 5-5 of FIG. a.

FIG. 6a is a side view of a quick connect fluid flow valve according to one embodiment.

FIG. 6b is a sectional view taken through line 6-6 of FIG. 6a.

FIG. 7a is a side view of a quick connect fluid flow valve according to one embodiment FIG. 7b is a sectional view taken through line 7-7 of FIG. 7a.

DETAILED DESCRIPTION

FIGS. 1a and 1b a quick connect fluid flow valve 10 for a fluid flow system according to one embodiment. The quick connect fluid flow valve has a housing 12, a flow passage insert, or a fluid flow insert, 14, and a moveable connector 16. The housing has a first end 18, and a second end 20.

The fluid flow insert 14 is disposed within at least a portion of the housing 12. As shown in FIGS. 1a and 1b, the flow passage insert 14 is disposed within a connected position. The flow passage insert 14 additionally has a disconnected position. In the connected position, the flow passage insert is moved towards the second end 20 of the housing 12. A biasing member 22 is disposed between the housing 12 and the flow passage insert 14. The biasing member 22 contacts both the housing 12 and the flow passage insert 14. The biasing member 22 is adapted to bias the flow passage insert 14 towards the disconnected position.

The moveable connector 16 is disposed in fluid communication with a flow path of the flow passage insert 14. The moveable connector 16 has at least one orifice 24, although a plurality of orifices 24 are shown. The moveable connector 16 is movable between at least a first position relative to the flow passage insert 14 and a second position relative to the flow passage insert 14. In the first position of the movable connector 16 (as shown in FIG. 1b) fluid can flow within the fluid flow path of the flow passage insert 14 and out of the at least one orifice 24 when the flow passage insert 14 is disposed in the connected position. In the second position of the moveable connector 16, fluid is prevented from flowing within the fluid flow path of the flow passage insert 14 and out of the at least one orifice 24 when the flow passage insert 14 is disposed within the connected position.

A connecting collar 26 connects the flow passage insert 14 to the movable connector 16. The connecting collar 26 causes the movable connector 16 to move with the flow passage insert 14 as the flow passage insert 14 moves towards the disconnected position. The connecting collar 26 interacts with a ledge portion of the movable connector 16. It is contemplated that the connecting collar 26 will only move the movable connector 16 when the flow passage insert 14 moves towards the disconnected position, and will not move the movable connector 16 when the flow passage insert 14 moves to the connected position. Rather, forward flow of fluid within the fluid passage will move the movable connector 16 to allow the fluid to flow out of the at least one orifice 24 of the movable connector 16.

The moveable connector 16 forms a generally fluid tight seal with the housing 12 when the flow passage insert 14 is disposed within the disconnected position preventing fluid flow within the fluid flow path of the flow passage insert 14 and out of the at least one orifice 24 of the movable connector 16. As shown in FIGS. 1a and 1b, an o-ring 28 rides in an o-ring retaining groove of the movable connector 16. The o-ring 28 contacts a sealing surface 30 on the second end 20 of the housing 12.

Turning now to FIGS. 2a and 2b, a quick connect fluid flow valve 40 for a fluid flow system according to one embodiment. The quick connect fluid flow valve 40 has a housing 12, a flow passage insert, or a fluid flow insert, 14, and a moveable connector 16. The quick connect fluid flow valve 40 is very similar to the quick connect fluid flow valve 10 of FIGS. 1a and 1b, except the quick connect fluid flow valve 40 has a reverse flow biasing member 42. The reverse flow biasing member 42 is disposed between a portion of the moveable connector 16 and a portion of the flow passage insert 14. The reverse flow biasing member 42 biases the moveable connector 16 towards the first position at the second side of the housing 12. The reverse flow biasing member 42 is compressed when back flow is occurring, thus allowing the moveable connector to move to the second position where the o-ring 28 contacts the sealing surface 30 on the housing 12 to prevent fluid flow within the fluid flow path of the flow passage insert 14. As shown in FIG. 2b, the reverse flow biasing member 42 is a wave spring.

FIGS. 3a and 3b show a quick connect fluid flow valve 50 for a fluid flow system according to another embodiment. The quick connect fluid flow valve 50 has a housing 12, a flow passage insert, or a fluid flow insert, 14, and a moveable connector 16. The quick connect fluid flow valve 50 is very similar to the quick connect fluid flow valve 40 of FIGS. 2a and 2b, except the quick connect fluid flow valve 50 has a first connecting collar 52 and a second connecting collar 54 that interact to connect the flow passage insert 14 to the movable connector 16. The first connecting collar 54 interacts with a kedge portion of the moveable connector 16 and also interacts with the second connecting collar 54. The second connecting collar 54 attaches to the flow passage insert 14.

FIGS. 4a and 4b show a quick connect fluid flow valve 60 for a fluid flow system according to a further embodiment. The quick connect fluid flow valve 60 has a housing 12, a flow passage insert, or a fluid flow insert, 14, and a moveable connector 16. The quick connect fluid flow valve 60 is very similar to the quick connect fluid flow valve 40 of FIGS. 2a and 2b, except the quick connect fluid flow valve 60 has a plurality of connecting arms 62 that connect the flow passage insert 14 to the movable connector 16. The connecting arms 62 causes the movable connector 16 to move with the flow passage insert 14 as the flow passage insert 14 moves towards the disconnected position, and thus provide the same function as the connecting collars 26, 52, 54 of the previous embodiments. It is contemplated that at least two connecting arms 62 will be utilized, and in some embodiments at least three connecting arms will be utilized.

FIGS. 5a and 5b depicts a quick connect fluid flow valve 70 for a fluid flow system according to yet another embodiment. The quick connect fluid flow valve 70 has a housing 12, a flow passage insert, or a fluid flow insert, 14, and a moveable connector 16. The quick connect fluid flow valve 70 is very similar to the quick connect fluid flow valve 40 of FIGS. 2a and 2b, except the quick connect fluid flow valve 70 has a reverse flow biasing member 72 in the form of a coil spring.

FIGS. 6a and 6b show a quick connect fluid flow valve 80 for a fluid flow system according to yet a further embodiment. The quick connect fluid flow valve 80 has a housing 12, a flow passage insert, or a fluid flow insert, 14, and a moveable connector 16. The quick connect fluid flow valve 80 is very similar to the quick connect fluid flow valve 50 of FIGS. 3a and 3b, except the quick connect fluid flow valve 80 has a reverse flow biasing member 72 in the form of a coil spring.

FIGS. 7a and 7b depict a quick connect fluid flow valve 90 for a fluid flow system according to still yet another embodiment. The quick connect fluid flow valve 90 has a housing 12, a flow passage insert, or a fluid flow insert, 14, and a moveable connector 16. The quick connect fluid flow valve 90 is very similar to the quick connect fluid flow valve 60 of FIGS. 4a and 4b, except the quick connect fluid flow valve 90 has a reverse flow biasing member 72 in the form of a coil spring.

What is claimed is:

1. A quick connect fluid valve assembly comprising:
   a housing having a first end an a second end;
   a flow passage insert disposed within at least a portion of the housing and having a fluid flow path defined within the flow passage insert, the flow passage insert having a connected position and a disconnected position;
   a moveable connector being disposed in fluid communication with flow path of the flow passage insert, the moveable connector having at least one orifice, the moveable connector being movable between at least a first position relative to the flow passage insert and a second position relative to the flow passage insert, wherein in the first position fluid can flow within the fluid flow path of the flow passage insert and out of the at least one orifice when the flow passage insert is disposed in the connected position, and in the second position fluid is prevented from flowing within the fluid flow path of the flow passage insert and out of the at least one orifice when the flow passage insert is disposed within the connected position; and a biasing member disposed between the housing and the flow passage insert and contacting both the housing and the flow passage insert, the biasing member biasing the flow passage insert towards the disconnected position; wherein the moveable connector forms a generally fluid tight seal with the housing when the flow passage insert is disposed within the disconnected position preventing fluid flow within the fluid flow path.

2. The quick connect fluid valve assembly of claim 1, further comprising a reverse flow biasing member, the reverse flow biasing member being disposed between a portion of the moveable connector and a portion of the flow passage insert, the reverse flow biasing member biasing the moveable connector towards the first position.

3. The quick connect fluid valve assembly of claim 2, wherein the reverse flow biasing member comprises a wave spring.

4. The quick connect fluid valve assembly of claim 2, wherein the reverse flow biasing member comprises a coil spring.

5. The quick connect fluid valve assembly of claim 1, wherein the movable connector has an O-ring within an O-ring channel at a distal end of the movable connector adapted to contact the housing to form a fluid tight seal when the flow passage insert is in the disconnected position.

6. The quick connect fluid valve assembly of claim 1, wherein the movable connector additionally has an O-ring adapted to contact the housing to form a fluid tight seal when the moveable quick connector is in the second position.

7. The quick connect fluid valve assembly of claim 1, further comprising a plurality of connecting arms attached to the flow passage insert and contacting a portion of the moveable connector, the plurality of connecting arms moving the movable connector relative to the housing when the flow passage insert moves to the disconnected position from the connected position.

8. The quick connect fluid valve assembly of claim 1, further comprising a connecting collar attached to the flow passage insert and contacting a portion of the moveable connector, the connecting collar moving the movable connector relative to the housing when the flow passage insert moves to the disconnected position from the connected position.

9. A quick connect fluid valve assembly comprising:
a housing;
a flow passage insert disposed at least partially within the housing and being movable relative to the housing between a disconnected position and a connected position, the flow passage insert having a flow path defined from a first end of the flow passage insert to a second end of the flow passage insert;
a moveable connector being disposed in fluid communication with the flow path of the flow passage insert, the moveable connector having at least one orifice, the moveable connector being movable between a forward fluid flow position and a backward fluid position relative to the flow passage insert, the movable connector having a ledge portion at a first end of the movable connector; the movable connector additionally being movable relative to the housing; and
a connecting collar being disposed between the flow passage insert and the moveable connector, the connecting collar having an extending lip at a first end of the connecting collar and being coupled to the flow passage insert at a second end of the connecting collar, the extending lip of the connecting collar contacting the ledge portion of the movable connector, wherein the movable connector moves substantially in conjunction with the flow passage insert and relative to the housing when the flow passage insert moves from the connected position to the disconnected position.

10. The quick connect fluid valve assembly of claim 9, further comprising a reverse flow biasing member, the reverse follow biasing member being disposed between a portion of the quick connector and a portion of the flow passage insert, the reverse flow biasing member biasing the quick connector towards the first position.

11. The quick connect fluid valve assembly of claim 10, wherein the reverse flow biasing member comprises a wave spring.

12. The quick connect fluid valve assembly of claim 10, wherein the reverse flow biasing member comprises a coil spring.

13. The quick connect fluid valve assembly of claim 9, wherein the movable connector additionally has an O-ring within an O-ring channel at a second end of the movable connector adapted to contact the housing to form a fluid tight seal when the flow passage insert is in the disconnected position.

14. The quick connect fluid valve assembly of claim 9, wherein the movable connector additionally has an O-ring within an O-ring channel at a second end of the movable connector adapted to contact the housing to form a fluid tight seal when the quick connector is in the second position.

15. The quick connect fluid valve assembly of claim 9, wherein the movable connector additionally has a plurality of orifices.

16. A quick connect fluid valve assembly comprising:
a housing;
a flow passage insert being disposed at least partially within the housing and being movable relative to the housing the flow passage insert forming a flow path from a first end of the flow passage insert to a second end of the flow passage insert;
a movable connector being disposed in fluid communication with the flow path of the flow passage insert and having at least one orifice, the movable connector being movable between a forward fluid flow position allowing forward fluid flow within the flow path of the flow passage insert and a backward fluid flow position preventing backward fluid flow within the flow path of the flow passage insert.

17. The quick connect fluid valve assembly of claim 16 further comprising a reverse flow biasing member, the reverse follow basing member being disposed between a portion of the quick connector and a portion of the flow passage insert, the reverse flow biasing member biasing the movable connector towards the forward fluid flow position.

18. The quick connect fluid valve assembly of claim 16, further comprising a connecting collar attached to the flow passage insert and contacting a portion of the moveable connector, the connecting collar moving the movable connector relative to the housing when the flow passage insert moves to the disconnected position from the connected position.

19. The quick connect fluid valve assembly of claim 16, further comprising a first connecting collar attached to the flow passage insert and a second connecting collar attached to the moveable connector, the first connecting collar contacting the second connecting collar, the connecting collars moving the movable connector relative to the housing when the flow passage insert moves to the disconnected position from the connected position.

20. The quick connect fluid valve assembly of claim 16, wherein the movable connector additionally has an O-ring within an O-ring channel at a first end of the movable connector adapted to contact the housing to form a fluid tight seal when the movable connector is in the backward fluid flow position.

* * * * *